Feb. 22, 1927.

J. C. SNODGRASS 1,618,236

AUTOMATIC BRAKING MECHANISM FOR MOTOR CARS

Filed July 20, 1926    2 Sheets-Sheet 1

Inventor
Joseph C. Snodgrass

By

Attorney

Feb. 22, 1927. 1,618,236
J. C. SNODGRASS
AUTOMATIC BRAKING MECHANISM FOR MOTOR CARS
Filed July 20, 1926   2 Sheets-Sheet 2

Inventor
Joseph C. Snodgrass

Attorney

Patented Feb. 22, 1927.

1,618,236

UNITED STATES PATENT OFFICE.

JOSEPH C. SNODGRASS, OF NASHVILLE, TENNESSEE, ASSIGNOR OF THREE-EIGHTHS TO ALBERT R. TALLMAN AND TWO-EIGHTHS TO BEVERLY R. McKINNIE, BOTH OF NASHVILLE, TENNESSEE.

AUTOMATIC BRAKING MECHANISM FOR MOTOR CARS.

Application filed July 20, 1926. Serial No. 123,725.

My invention relates to brakes, more especially for motor vehicles or automobiles, and has for its object, to provide an automatic braking mechanism which is throttle or accelerator controlled, forming part of the vacuum system and throttle controlled either through a hand throttle lever or through a foot pedal of the accelerator. The invention consists in the features hereinafter described and then sought to be clearly defined by the claims, reference being had to the accompanying drawings showing the preferred embodiment of the invention, and in which—

Figure 8 is a front view of the brake mechanism diaphragm chamber;

Figure 9 is a section through the chamber and showing a bell crank lever for connecting the diaphragm to the brake rods.

Figure 1:
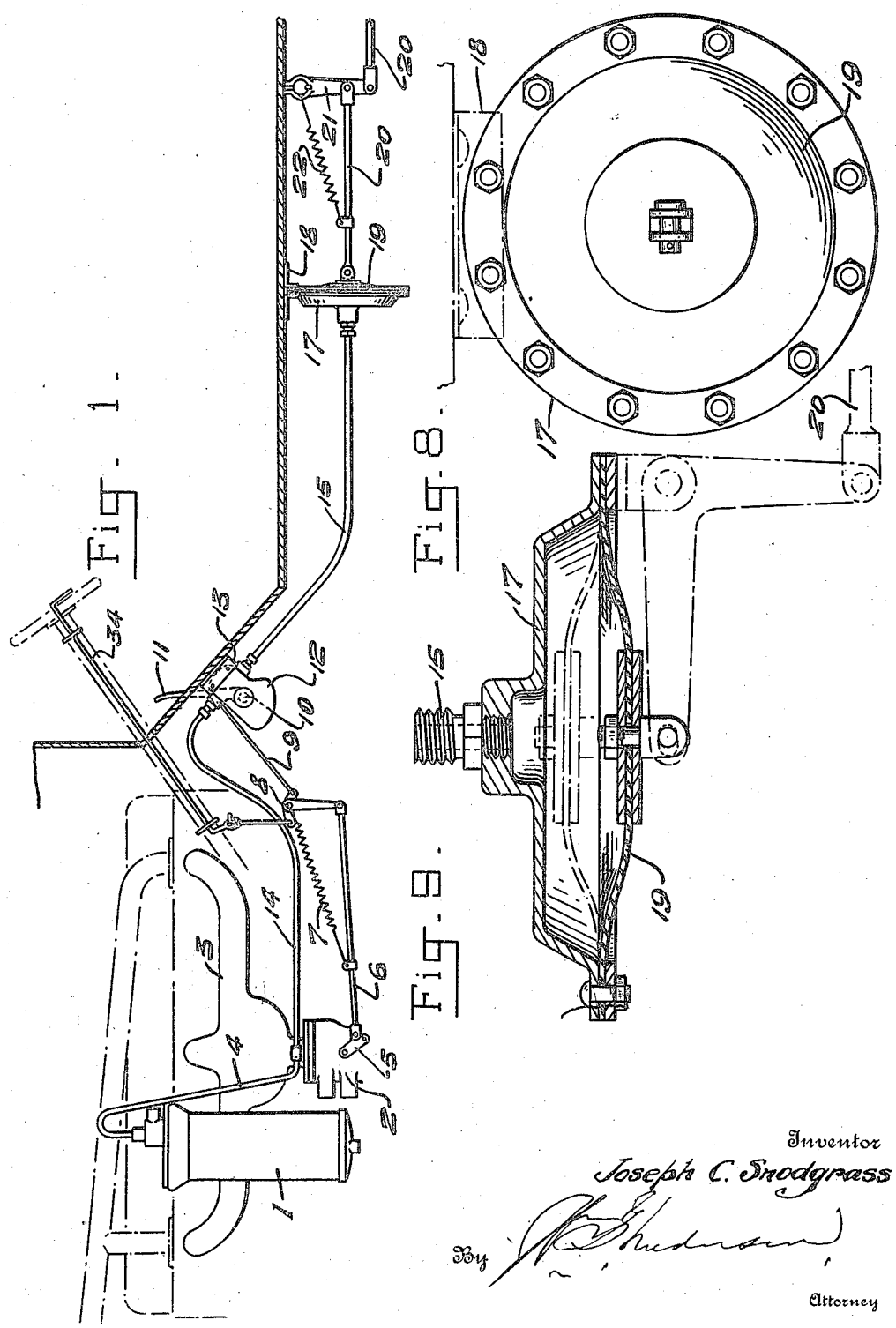
Figure 1 is a side elevation of a car with portions omitted and illustrating the application of this invention.
Figure 2:
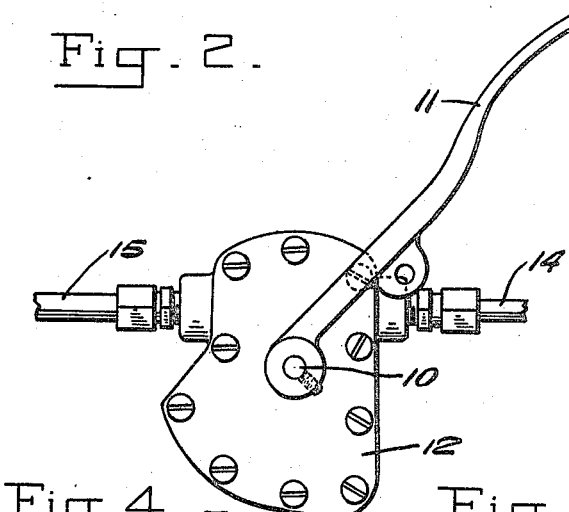
Figure 2 is a side elevation of the vacuum chamber.
Figure 3:
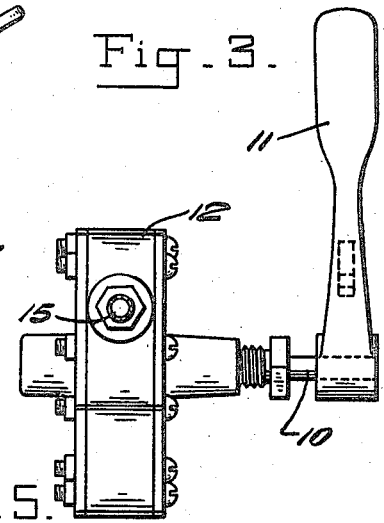
Figure 3 is an end view of Figure 2.
Figure 4:
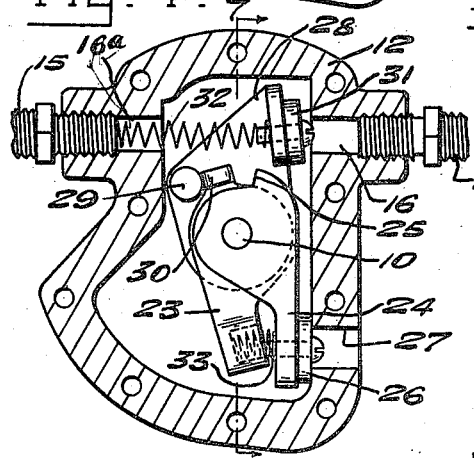
Figure 4 is a vertical section through the vacuum chamber showing position of the port valves when brakes are set.

In the drawings the numeral 1 designates a vacuum tank, 2 a carburetor, 3 a manifold, 4 a vacuum lead pipe, and 5, 6, 7, 8, and 9 a conventional representation of a throttle mechanism for controlling the supply of fuel or gas for the engine, which several parts may be of any approved well known type and the showing made is sufficient for the purpose of illustrating the application of the present invention and therefore need not be more fully illustrated and described.

Figure 5:
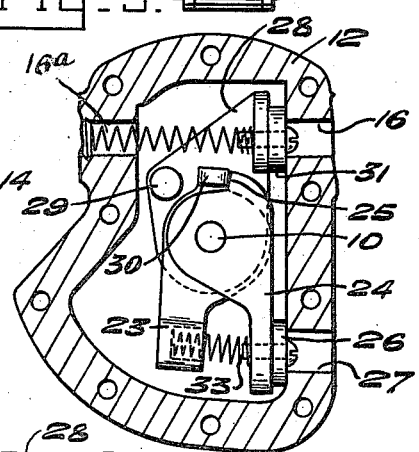
Figure 5 is a vertical section showing position of the port valves when the brakes are released and the car standing at rest.
Figure 6:
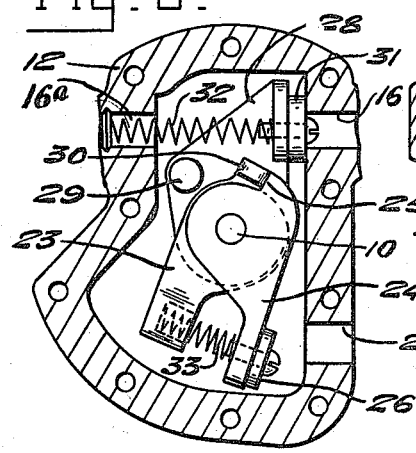
Figure 6 is a vertical section showing position of the port valves when the brakes are released.
Figure 7:
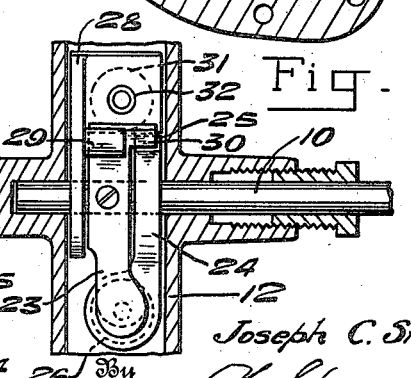
Figure 7 is a section on line 7—7 of Figure 4.

Under the present invention there is associated with the rotatable shaft 10 and foot pedal 11, which may correspond to the foot pedal of an automobile accelerator, a shell or casing 12 supported by angle-plates 13, or otherwise, from a suitable part of the car, which has a pipe 14 in communication at one end with the vacuum portion of the system, say, with the intake of the manifold, as illustrated, and the other end in communication with the chamber of casing 12, and another pipe 15 leads from a port 16 of the casing to a diaphragm-chamber 17 supported by angle-plates 18, or otherwise, from a suitable part of the car, the flexible diaphragm 19 of the chamber being suitably connected with the brakes of the car, for instance by the links or rods 20, rocking arm or lever 21, and retracting spring 22. The shaft 10 has fixed thereto to rotate therewith an arm 23, and at one side of arm 23 the shaft carries a loosely mounted arm 24 formed with a shoulder 25 and having a valve 26 to control the port 27 formed in the casing and opening to atmosphere, and at the opposite side of arm 23 there is loosely mounted on the shaft an arm 28 having a stud or pin 29 in the path of the stud 30 carried by arm 23 and also having a valve 31 for the port 16. A spring 32 bears at one end against the arm 28 and at the other end against a part of the casing, which may be the nipple which couples the vacuum lead pipe 14 to the casing, and a spring 33 bears at one end against the valve carrying end of the arm 24 and at the other end against the adjacent end of arm 23, as illustrated in Figures 4 to 7 of the drawings. When the throttle is closed and the car not running, ports 16 and 27 are closed by the valves 26 and 31 under the tension of the springs 33 and 32, respectively, as illustrated in Figure 5. When the car is running, with the foot of the operator on the pedal corresponding to the accelerator pedal, or the operator actuates the lever 34 controlling the throttle, so as to open the throttle for the feed of fuel or gas, the arm 23 is moved to the position shown in Figure 6 and its stud 30 bearing against shoulder 25 of arm 24 moves the latter to the position to open port 27 to break the vacuum in the chamber of casing 12, while valve 31 is in position to close port 16, from which pipe 14 leads to the manifold, and held so by spring 32 so that the vacuum system is cut-off and vacuum in casing chamber 12 and in the valve-diaphragm chamber 17 is broken and the brakes are placed in released position under the influence of spring 22. When the supply of gas is cut-off from the engine by closing the throttle by manipulation of the throttle lever, or by removing the foot from the pedal lever corresponding to the accelerator pedal, and restoration of parts to normal position under the influence of spring 7, the arm 23, by rotation of its shaft 10, is moved to the position shown in Figure 4 and through spring 33 the valve 26 closes port 27, to atmosphere, and arm 28 moves to the position indicated in Figure 4 by stud 30 of arm 23 pressing against pin 29 of arm 28 so as to open port 16 and permit the vacuum in casing 12 derived through its connection with the vacuum system or manifold to exert itself in the diaphragm chamber 17 and on the flexible diaphragm of that chamber so as to pull on the brake rods and apply the brakes.

It will be perceived from the foregoing that the brake mechanism of the car is actuated by or from the vacuum created in the manifold, or otherwise, and that the control is effected through or from manipulation of the throttle which controls the supply of more or less gas to the engine according as it is moved by either the throttle hand lever or by the accelerator pedal, and thus the operation of the brake-mechanism is automatic, following the operation of the throttle.

When the phrase "throttle control" is used herein it has reference to means employed for controlling the supply of the fuel or gas to the engine for running or operating the car; and the phrase "vacuum control" has reference to a vacuum created through the manifold, or otherwise, and employed for applying and releasing the brakes or braking mechanism of the car.

Before closing it may be mentioned that there is a slight movement or rocking of the arm 23 under a yielding pressure before its stud 30 is brought into bearing contact with the pin 29 of arm 28 to open valve 31, thus permitting a more or less gradual opening and closing of the throttle and also of vacuum control of the braking mechanism without detracting from efficient promptness of action.

While I have illustrated and described the preferred embodiment of the invention and construction of the individual elements or units thereof it is to be understood that changes or variations may be made therein without departing from essential features of the invention.

By advancing the hand lever of the throttle slightly the operation of the parts as described may be made, for the time, inoperative, and the car may be run independently of the automatic braking mechanism.

Having described my invention and set forth its merits what I claim is:—

1. A braking mechanism for motor vehicles comprising means for creating a vacuum, means for applying the vacuum for actuating the brakes, means for breaking the vacuum to release the brakes, and a "throttle control" fuel supply cooperatively associated with the vacuum control for applying the vacuum to set the brakes when the throttle is in one position and breaking the vacuum to release the brakes when the throttle is in another position.

2. A braking mechanism for motor vehicles comprising a vacuum creating means, a vacuum brake-setting means, a vacuum chamber in communication with the vacuum brake-setting means and in valve-controlled communication with the vacuum creating means, and a "throttle control" operatively connected with the valve of the vacuum chamber to open and close communication with the vacuum creating means.

3. A braking mechanism for motor vehicles comprising a vacuum creating means, a vacuum brake-setting means, a vacuum chamber in communication with the vacuum brake-setting means, a valve controlled port to the vacuum chamber, and a "throttle control" operatively connected with said valve to break the vacuum between the chamber and the vacuum brake-setting means for releasing the brake.

4. A braking mechanism for motor vehicles comprising a vacuum creating means, a vacuum brake-setting means, a vacuum chamber having a valve controlled communication with the vacuum creating means and provided with a vacuum breaking valve, and a "throttle control" operatively connected with said valves to operate one to control communication between the chamber and vacuum creating means and to operate the other to break the vacuum in the chamber and the vacuum brake-setting means.

5. A braking mechanism for motor vehicles comprising a vacuum chamber connected with brake-setting and release mechanism and having a valve controlled port through which a vacuum is created in the chamber and a valve-controlled vacuum-breaking port, and means cooperatively connected with said valves to open the vacuum creating port and close the vacuum breaking port in setting the brakes, and to close the vacuum creating port and open the vacuum breaking port in releasing the brakes.

In testimony whereof I affix my signature.

JOSEPH C. SNODGRASS.